United States Patent [19]
Goetz

[11] Patent Number: 5,253,612
[45] Date of Patent: Oct. 19, 1993

[54] STACKABLE PET CARRIER

[75] Inventor: Charles R. Goetz, Carnegie, Pa.

[73] Assignee: Alco Industries Inc., Valley Forge, Pa.

[21] Appl. No.: 866,889

[22] Filed: Mar. 30, 1992

[51] Int. Cl.⁵ ............................................. A01K 13/00
[52] U.S. Cl. ...................................................... 119/19
[58] Field of Search .................................... 119/17, 19

[56] References Cited
U.S. PATENT DOCUMENTS 2,790,414  4/1957  Rossow ................................. 119/19
3,985,102 10/1976  Yonezawa ........................... 119/19
4,852,520  8/1989  Goetz ................................... 119/19
4,977,857 12/1990  Slawinski ............................ 119/19

Primary Examiner—Gene Mancene
Assistant Examiner—Thomas Price
Attorney, Agent, or Firm—William J. Ruano

[57] ABSTRACT

A pet carrier having ventilated sidewalls and four supports at the corners of the bottom of the carrier. Each support contains a roller that is selectively retractable into the support or projected outwardly to enable the carrier to be pulled by a pull cord. Four corresponding receptacles are secured to the corners of the top of the pet carrier of slightly greater dimension than said supports so as to snugly receive said supports when like carriers are in stacked position.

7 Claims, 4 Drawing Sheets

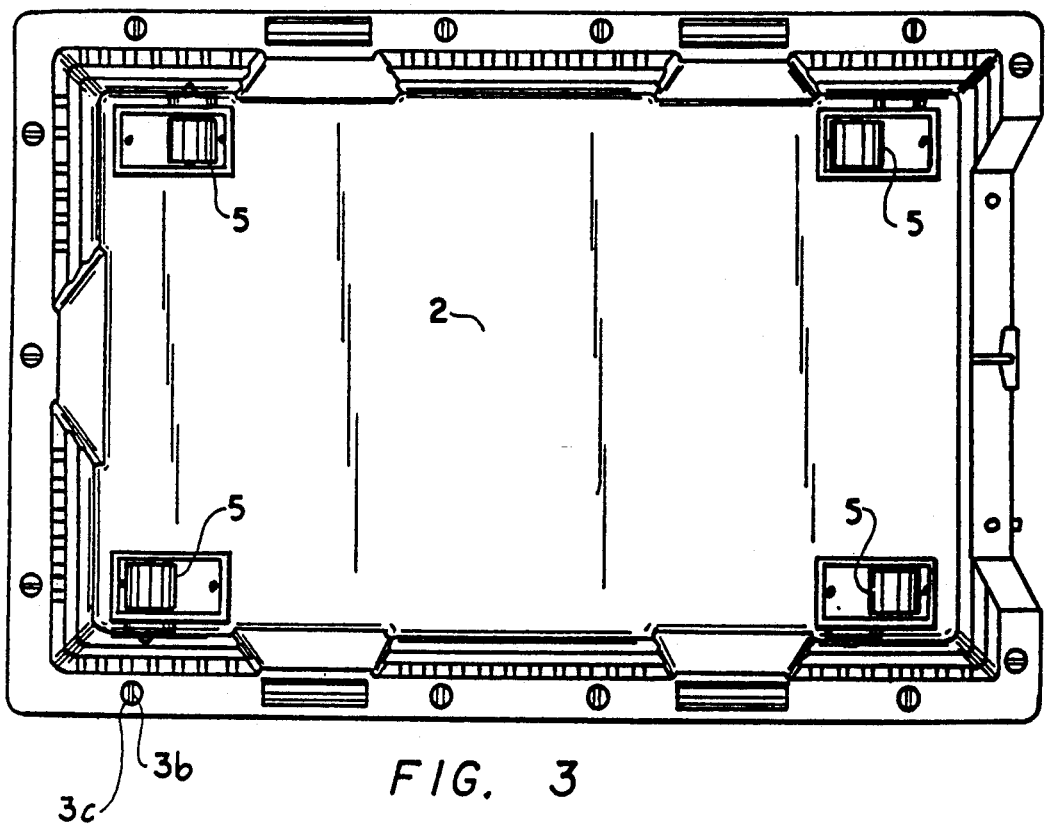
FIG. 3
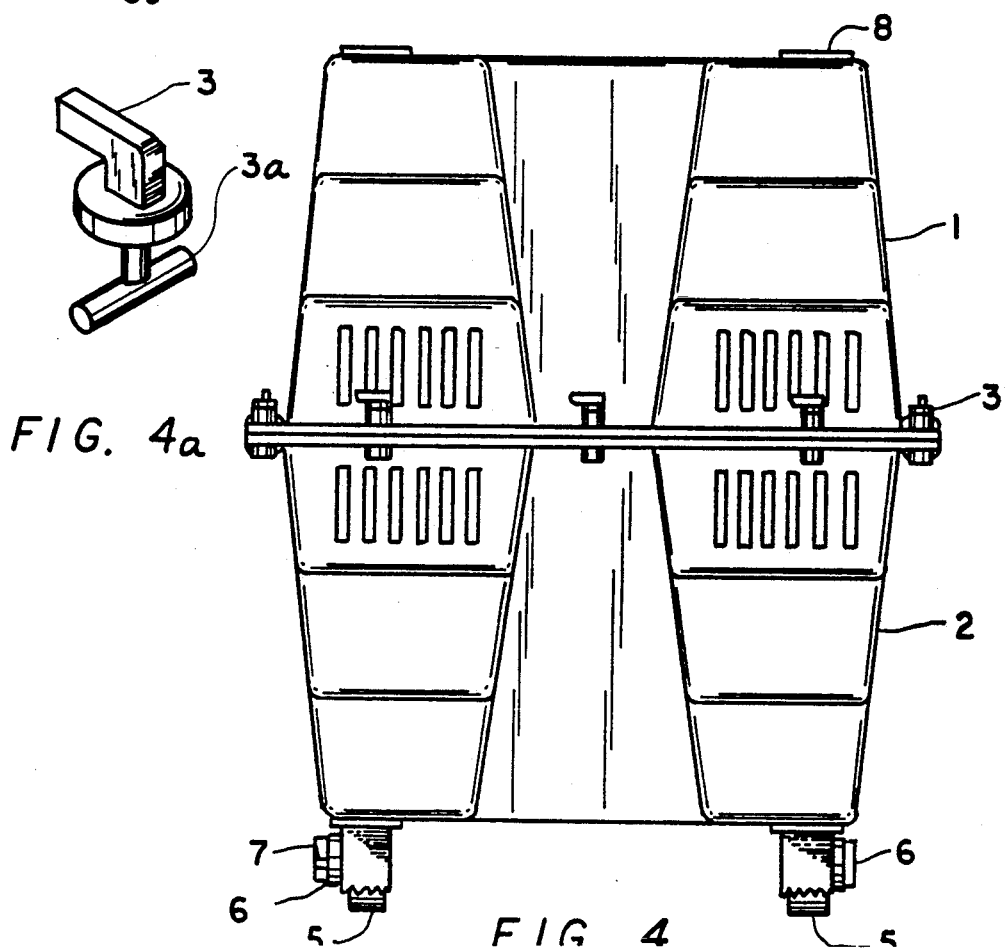
FIG. 4a
FIG. 4

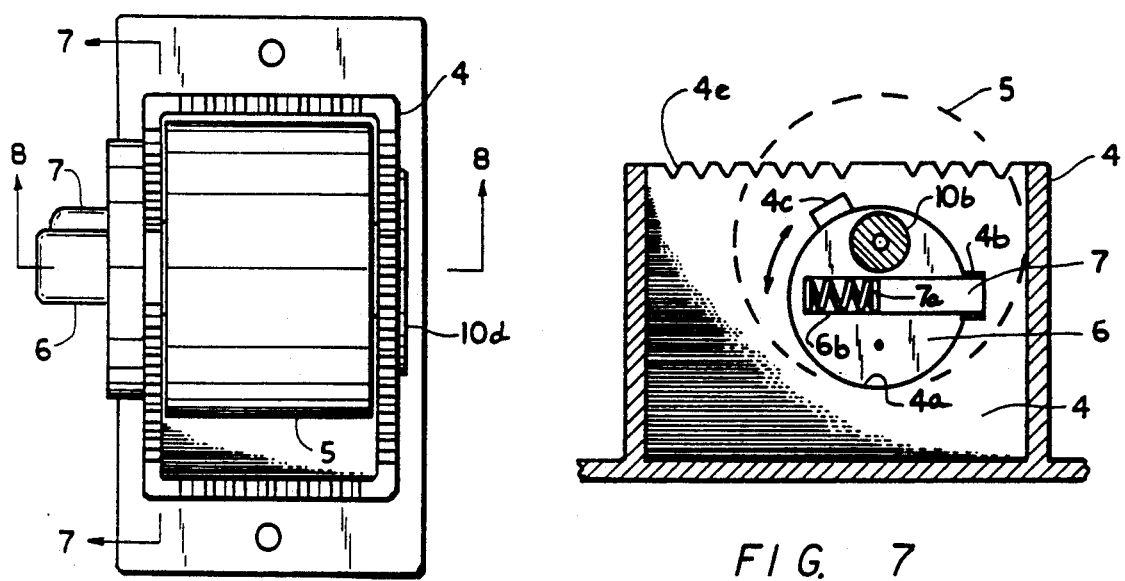
FIG. 6
FIG. 7
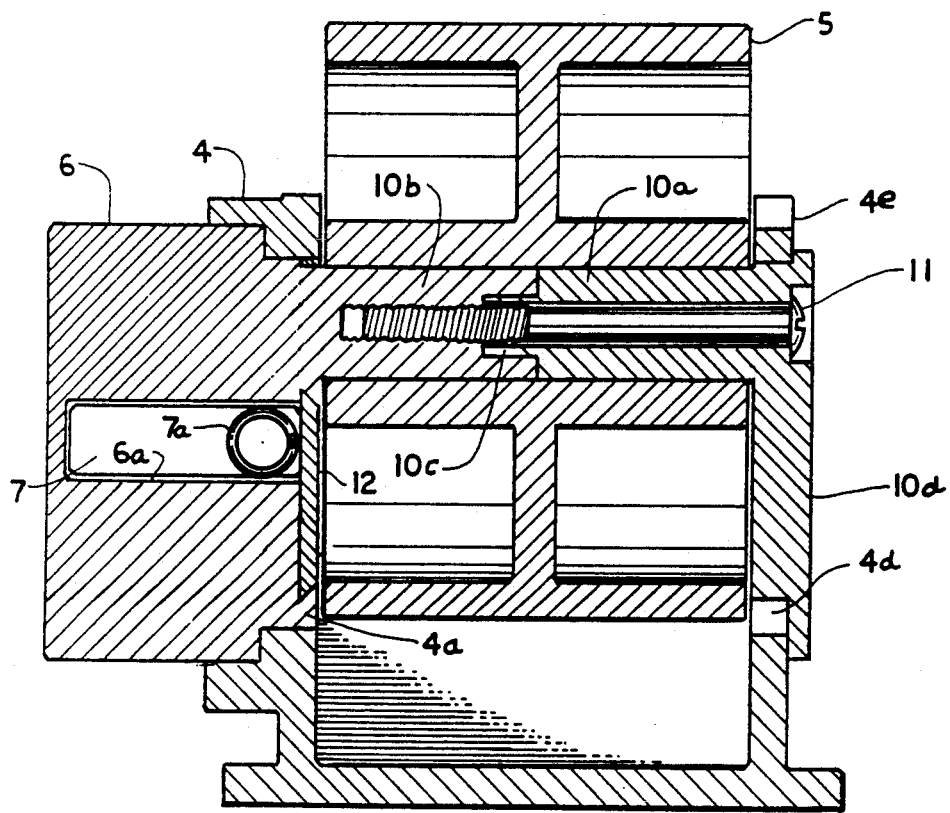
FIG. 8

STACKABLE PET CARRIER

BACKGROUND OF THE INVENTION

In shipping pet carriers by rail or air, problems have arisen because of the space requirements, particularly for large pet carriers. Also since such carriers are mounted on wheels, the problem is compounded.

SUMMARY OF THE INVENTION

An object of the present invention is to overcome the abovementioned problems by providing a novel stackable pet carrier mounted on retractible wheels and having top receptacles for supporting a carrier when its wheels have been retracted. A further object is to provide improved and reliable means for securely holding together the two interconnected stacked parts of the carrier itself. Another object is to provide means for selectively pulling the carrier or having it transported by a belt conveyor.

BRIEF DESCRIPTION OF THE DRAWINGS

FIG. 3 is a bottom view and FIG. 4 is an end view thereof showing the wheels 5 in operative position. FIG. 4a is an enlarged perspective of fastener 3.

FIGS. 5a and 5b are enlarged fragmentary views showing the door in the unlocked and locked positions.

FIG. 6 is an enlarged bottom view of box 4 and its assembly.

FIG. 7 is a cross-sectional view taken along line 7—7 of FIG. 6 (items 6, 12 and 13 are removed).

FIG. 8 is an enlarged sectional view taken along line 8—8 of FIG. 6.

DESCRIPTION OF THE PREFERRED EMBODIMENT

Figure 1:
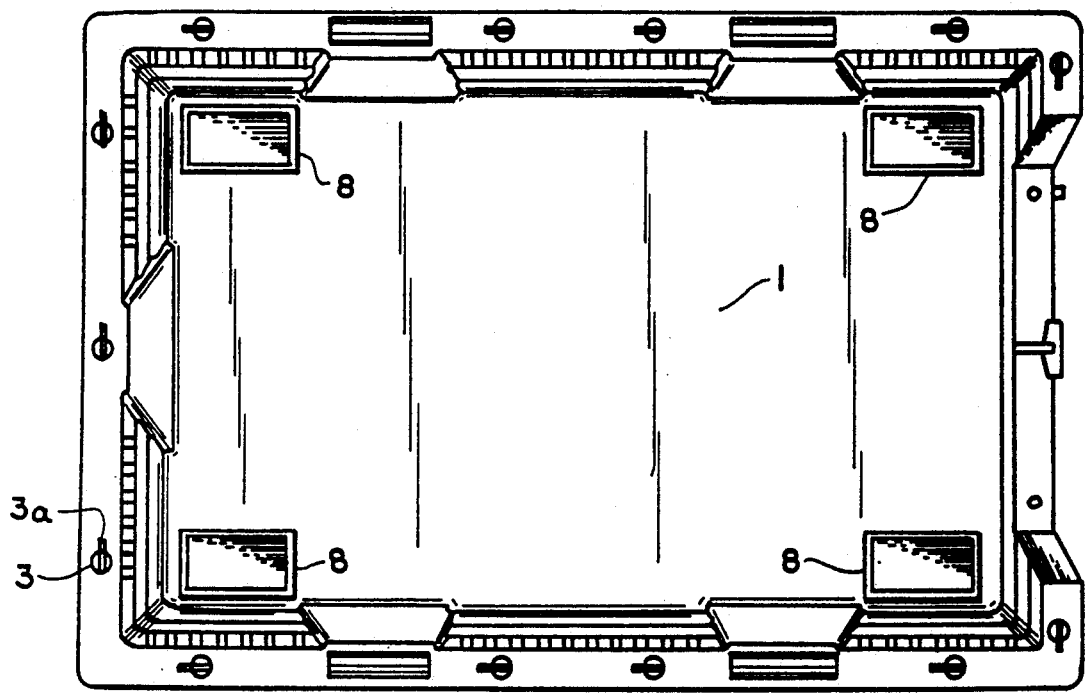
FIG. 1 is a top view and FIG. 2 is a side view of a stackable pet carrier embodying the present invention.

Referring to the Figures, numeral 1 denotes a top portion and numeral 2 denotes a separate bottom portion of a pet carrier which are fastened together by detachable fastening means 3.

Such fastening means 3 comprises a knob portion 3 having outwardly extending pins 3a which, upon turning the knob portion, effect camming by portion 3 and tightening together top portion 1 and bottom portion 2 of the pet carrier.

Such fastening means 3 is shown in FIG. 3, FIG. 4, and FIG. 4a. Portion 3a shown in FIG. 4a is inserted in slot 3b as shown in FIG. 3 and turned 900 so that portion 3a effects a camming action with 3c in FIG. 3. The end result is a clamping action which holds the top half and bottom half securely together. At the bottom of the carrier, four supports 4 are provided of rectangular construction, the bottom of which is serrated at 4e so that the pet carrier can be positively moved on a driven belt without the danger of roll back or so that it may more firmly engage a floor. Internal of the support 4 is an upwardly retractible roller 5 rotated by a knob 6 upon pushing in a locking pin 7 to enable simple hand force to turn the knob which, by cam action, will retract the roller 5 so as to extend below the bottom of support 4.

On top of top portion 1 are rigidly mounted four rectangular receptacles 8 for receiving the bottom portions of supports 4 when two or more pet carriers are stacked, such as in an airport or railway storage room. Such bottom portions may be either smooth or serrated.

Referring to FIGS. 6, 7 and 8, locking pin 7 fits in a slot 6a machined in rectangular knob 6. Knob 6 rotates in a circular hole or bearing 4a machined in the wheel rectangular box 4. Two slots 4b and 4c are machined in hole 4a as shown in FIG. 7. As the knob 6 is rotated, the locking pin 7 is pushed into either slot 4c or 4b by spring 7a. The slot 4b is used when the wheel is to be used (see dash line 5) and slot 4c is used when the wheel is retracted into box 4.

As can be seen in FIGS. 7 and 8, the wheel axles 10a and 10b are offset from the center of knob 6. As knob 6 is rotated counter clockwise as shown by the arrow in FIG. 7, the wheel 5 will rotate to a position inside wheel box 4. At this point spring 7a will push locking pin 7 into slot 4c and lock the wheel in the retracted position.

As shown in FIG. 8, the bolt 11 holds the assembly together. Axle 10b is sized for thread forming screw 11. Also as shown in FIG. 8, axles 10a and 10b are locked together (at 10c) so they will rotate as one unit when knob 6 is rotated. This will cause outer disc-shaped portion 10d of axle 10b to rotate about the axis of bolt 11.

Knob 6 has slot 6a molded to accommodate locking pin 7 urged by the spring 7a. The spring is held in position by a cover 12 which slides in a dovetail to enclose the assembly.

Figure 2:
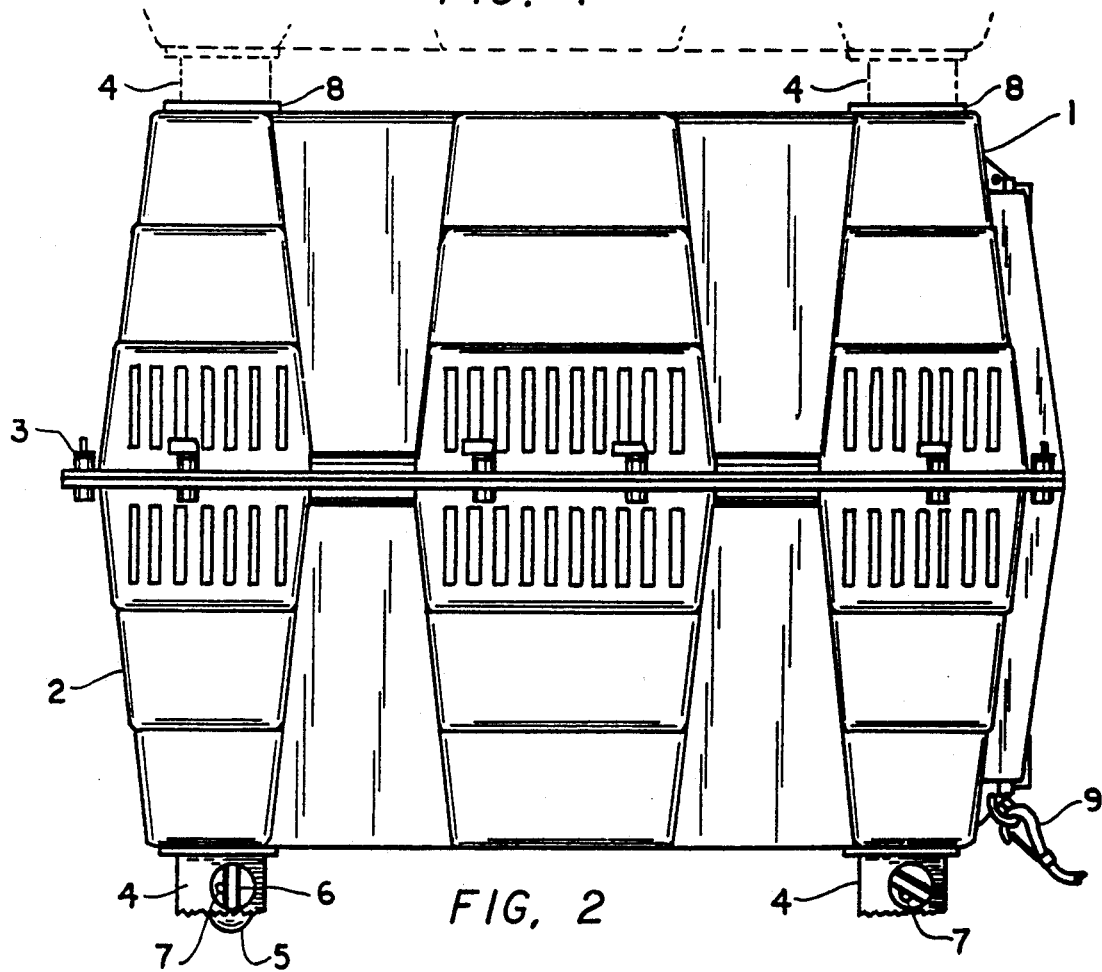

As shown in FIG. 2 a spring connected pull cord 9, a fragmentary portion of which is shown, is mounted on a ring in the front of the carrier to enable pulling of the carrier when the wheels or rollers 5 are in the operative position as shown in FIG. 4. The pull cord 9 may, instead, be hooked onto a ring inserted in the opening shown on the top of FIG. 2.

Figure 5:
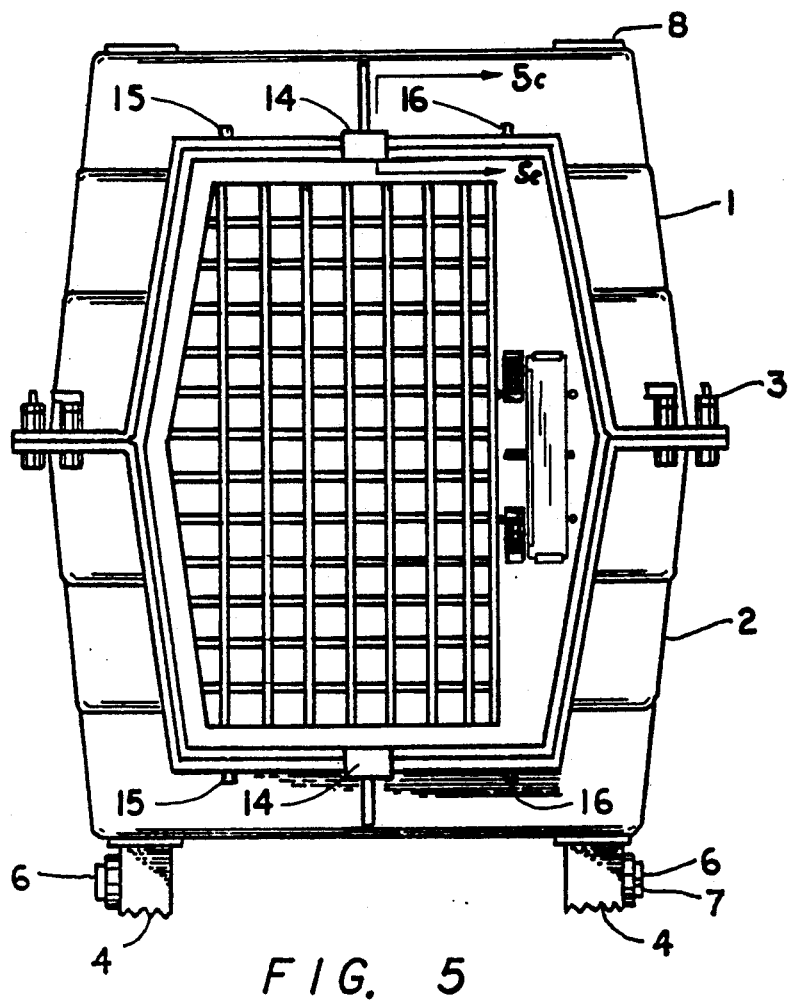
FIG. 5 is an end view thereof showing wheels 5 retracted inwardly of box 4.
Figure 5C:
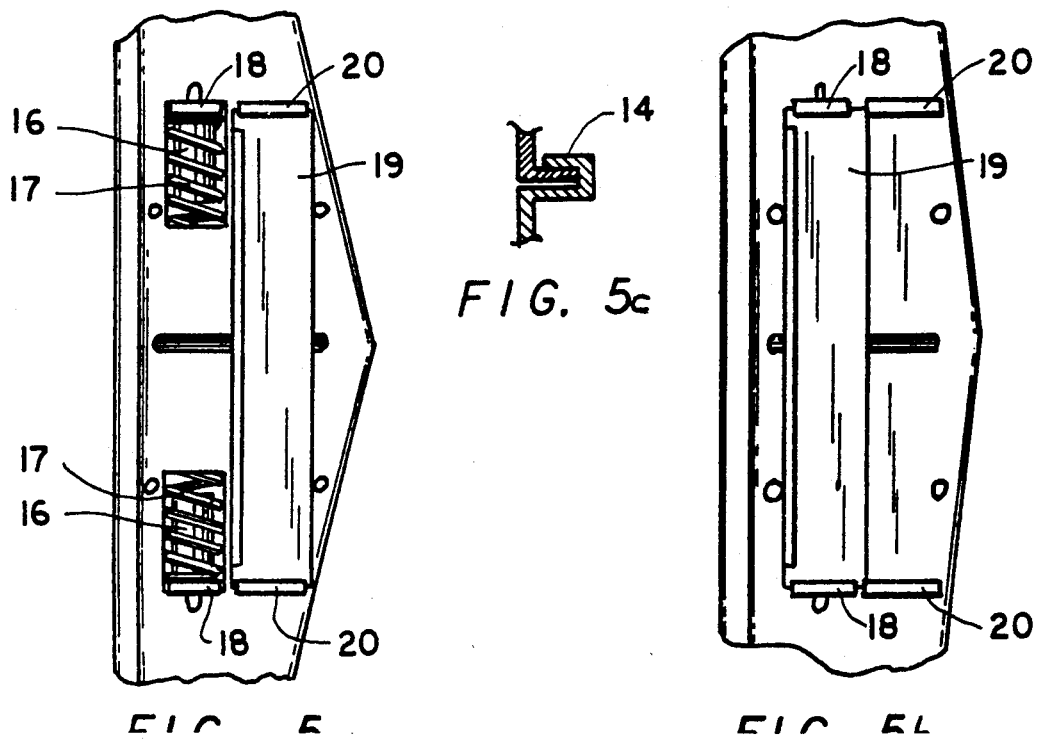
FIG. 5c is a section of FIG. 5.

Referring to FIG. 5, before the top and bottom portions 1 and 2 are clamped together by fastening means 3, hinges 15, 15 and lock bars 16, 16 are inserted in the top and bottom portions of the frames of portions 1 and 2. Upon clamping portions I and 2 together, the U-shaped clamps 14,14 of the grid shaped door clamp onto said frames to securely hold portions 1 and 2 together. At this time, as best shown in FIG. 5a, lock bars 16, 16 at the right are biased into the door locking position by springs 17, 17 whereby lock bars 16, 16 on the right will keep the door locked.

When it is desired to open the door, door latch handles 18, 18 are squeezed toward each other resisted by the tension of springs 17, 17 to retract lock bars 16, 16, at the right, from the top and bottom portions 1 and 2, whereupon the door will pivot about hinges 15, 15 on the left.

As a safety measure, to insure against accidental squeezing together of handles 18, 18 a laterally slidable door lock 19 is slid along guides 20, 20 to the left from the position shown in FIG. 5a to that shown in FIG. 5b to insure against such accidental squeezing together of handles 18, 18 or accidental lock bar movement.

Hinge pins are enclosed for safety, to prevent eye injuries etc.

Lock bar housings are enclosed for safety to prevent unplanned pressure on lock bars releasing from lock bar housings.

The gate device is steel wire grid weldment enclosed at its periphery in a molded frame to prevent injuries from sheared wire grid ends.

While I have illustrated and described a single specific embodiment of my invention, it will be understood that this is by way of illustration only and that various changes and modifications may be contemplated in my invention within the scope of the following claims.

I claim:

1. A pet carrier comprising a top portion and a bottom portion detachably fastened together, said top and bottom portions having ventilated sidewalls, an end wall of said pet carrier having a door extending into said top and bottom portions, and hinge means extending into said top and bottom portions for pivotally opening said door, a plurality of supports underneath the bottom thereof, a roller contained in each of said supports, means for selectively moving said rollers vertically so that their lower surfaces are selectively moved above or below the bottom of said supports, together with a plurality of receptacles mounted on the top of said carrier and positioned in vertical alignment with said supports, so that when two like carriers are stacked, the rollers of one will be contained within the receptacles of the other, said pet carrier being of substantially rectangular box-like construction of having four supports on the four corners of the bottom thereof and having four rollers, each contained in one of said supports and wherein each of said supports comprises rectangular sidewalls open at the bottom, and a knob connected to the outside of said rectangular sidewalls, and cam means operated by turning of said knob to selectively move said rollers vertically so that the lower surfaces of said rollers are selectively moved and locked in position above or below the bottom surfaces of said rectangular sidewalls.

2. A pet carrier as recited in claim 1 wherein said plurality of receptacles mounted on the top of said carrier are four in number and having rectangular sidewalls.

3. A pet carrier as recited in claim 2 wherein the bottom of said rectangular sidewalls of said support is serrated.

4. A pet carrier as recited in claim 3 wherein said rectangular box-like construction of the carrier is subdivided into a top half and a separate bottom half, and manually operated one piece fastening means for clamping said top and bottom halves together.

5. A pet carrier as recited in claim 1 together with a pull cord attached to one end thereof for pulling the carrier when said rollers are locked below the bottom of said supports.

6. A pet carrier as recited in claim 1 wherein said means comprising, for each support, a rotatable know, a bearing for said knob formed on a wall of said support, said roller being eccentrically mounted and rotatable relative to aid bearing.

7. A pet carrier as recited in claim 6 wherein said knob includes a spring biased locking pin, and a pair of slots in said wall of said support concentric with said bearing, wherein one of said pair of slots locks said roller in a retracted position inside said support, and the other of said pair of slots locks said roller in a projected position beyond the bottom of said support to place said rollers in the operative position, when said locking pin is selectively projected into said pair of slots.

* * * * *